US007171682B2

(12) United States Patent
Katada et al.

(10) Patent No.: US 7,171,682 B2
(45) Date of Patent: *Jan. 30, 2007

(54) SECURITY SYSTEM FOR OUTPUT DEVICE

(75) Inventors: Toshiharu Katada, Nagano-ken (JP); Yasushi Nakaoka, Nagano-ken (JP); Satoshi Miyazawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 874 days.

This patent is subject to a terminal disclaimer.

(21) Appl. No.: 10/105,383

(22) Filed: Mar. 26, 2002

(65) Prior Publication Data

US 2002/0157022 A1 Oct. 24, 2002

(30) Foreign Application Priority Data

Apr. 5, 2001 (JP) ............................. 2001-107219

(51) Int. Cl.
*G06F 9/00* (2006.01)
(52) U.S. Cl. ........................................ 726/11; 709/225
(58) Field of Classification Search .................... 726/2, 726/3, 27, 29, 30, 11, 12
See application file for complete search history.

(56) References Cited

U.S. PATENT DOCUMENTS

| 5,944,823 | A * | 8/1999 | Jade et al. ..................... 726/15 |
| 6,751,732 | B2 * | 6/2004 | Strobel et al. ............... 713/176 |
| 6,947,897 | B2 * | 9/2005 | Lortscher et al. ............. 705/14 |
| 2002/0103903 | A1 * | 8/2002 | Bruton et al. ............... 709/225 |
| 2002/0129118 | A1 * | 9/2002 | Cherry ....................... 709/217 |
| 2002/0143773 | A1 * | 10/2002 | Spicer et al. ................. 707/10 |
| 2003/0030843 | A1 * | 2/2003 | Qiao ......................... 358/1.15 |
| 2003/0163732 | A1 * | 8/2003 | Parry ........................ 713/201 |
| 2004/0100651 | A1 * | 5/2004 | Leone et al. ............... 358/1.15 |

FOREIGN PATENT DOCUMENTS

| EP | 0 893 760 A2 | 1/1999 |
| JP | 02-306742 | 12/1990 |
| JP | 08-314835 | 11/1996 |
| JP | B2 2783345 | 5/1998 |

(Continued)

OTHER PUBLICATIONS

F.D. Wright, "Design Goals for an Internet Printing Protocol", RFC 2567, Apr. 30, 1999, (http://www.faqs/prgrfcsrfc2567.html).

*Primary Examiner*—Matthew Smithers
(74) *Attorney, Agent, or Firm*—Oliff & Berridge, PLC

(57) ABSTRACT

A constructed system includes multiple clients, a server like a print portal, and multiple printers connecting with a network. A client transmits a printing requirement, which specifies a content of interest to be printed and a printer as an output resource, to the print portal. The print portal transmits the specified content of interest to the specified printer, which then carries out the actual printing operation. A security system interposed between the print portal and the printer in principle refuses transmission of data from the print portal, but allows transmission of the printing requirement from the client when direct communication between the printer and the client is established by means of infrared ray or feeble radio wave. This arrangement ensures the sufficient level of security, while enhancing utility of printing via the network.

26 Claims, 12 Drawing Sheets

FOREIGN PATENT DOCUMENTS

| | | |
|---|---|---|
| JP | B2 2797997 | 7/1998 |
| JP | 11-146118 | 5/1999 |
| JP | 11-348386 | 12/1999 |
| JP | B2 3014280 | 12/1999 |
| JP | B2 3017612 | 12/1999 |
| JP | 2000-78328 | 3/2000 |
| JP | B2 3062397 | 4/2000 |
| JP | 2000-177212 | 6/2000 |

* cited by examiner

SECURITY SYSTEM FOR OUTPUT DEVICE

BACKGROUND OF THE INVENTION

1. Field of the Invention

The present invention relates to a security technique that prevents illegal accesses to an output device connecting with a network, while ensuring convenience of output via the network.

2. Description of the Related Art

A variety of printers are used as an output device of computers. The printer is conventionally one-to-one connected to a computer via a specific cable like a two-way parallel interface (hereinafter referred to as 'local connection'), and receives data from the computer to carry out printing. With recent advancement of LAN (Local Area Network), multiple printers connecting with a network share one or plural printers connected to the network.

Application of a certain protocol called IPP (Internet Printing Protocol) actualizes printing between an arbitrary client and an arbitrary printing apparatus, both connecting with the Internet. The IPP specifies an output resource with a URI (Uniform Resource Indicator) and actualizes printing via the Internet.

The recent development of the information infrastructure, such as the Internet, and the improvement in mobility of terminals used for access to the information infrastructure, such as mobile computers and cellular phones, enable access to information from any locations. In such circumstances, the technique of allowing free choice of the output resource for printing on the Internet has been highly demanded.

The high level of security is required in the system of printing via the Internet, in order to prevent illegal accesses to the printing apparatus. The printing apparatus used as the output resource is thus generally connected to the Internet via a security system called firewall.

The prior art security system, however, fails in sufficiently taking advantage of printing via the Internet.

In one practical example, it is assumed that a user makes an estimate sheet with a user's own computer and tries to print the estimate sheet in a customer's office. If a printer in the customer's office is connected to the Internet without any security system, the user can print the estimate sheet via the Internet by simply specifying the URI of the printer. In the actual situation, however, the security system is present to interfere with transmission of print data from the user's computer to the printer in the customer's office and prohibit printing.

Such a problem is not restricted to printing via the Internet but is commonly found in the case of utilizing a printing apparatus connected to any of diverse networks like an Intranet via the security system. This requirement is not restricted to printing but commonly arises in general output devices for images, documents, sound, and any other data.

SUMMARY OF THE INVENTION

The object of the present invention is thus to provide a technique that ensures the sufficient level of security in output via a network while enhancing utility of such output.

At least part of the above and the other related objects is attained by a security system, as a first construction, that is interposed between an output device and an external network and limits external access to the output device. The security system includes a filtering module, a detection module, and a control module. The external network represents any network that is separate from the output device by the security system. Here the network is not restricted to a wide area network like the Internet but also includes relatively limited networks like LAN (Local Area Network) and Intranet. The output device may be any of diverse devices that output images, documents, sound, and other data. Typical examples include printing devices that print images, display devices that display images like projectors and displays, and audio equipment that output sound.

The filtering module refuses transmission of data from the external network under a predetermined condition. This ensures the sufficient level of security under the predetermined condition. The predetermined condition may be any of diverse conditions that are utilized in the prior art security system, for example, restriction on the data transmitter, restriction on the destination of transmission, or restriction on the protocol.

The detection module detects establishment of direct communication between the output device and a client, which gives an output requirement to the output device. The direct communication represents any communication not via the network, and includes both wire communication and wireless communication.

The direct communication is established when the client is located relatively close to the output device. In such cases, temporary remission of the security level with regard to the client does not cause any troubles. When the establishment of direct communication is detected, the control module accordingly controls the filtering module to cancel the refusal to the output requirement given by the client.

When the client is located relatively close to the output device, the client succeeds in executing output via the network without being interfered by the security system. When the client is apart from the output device to fail in establishing direct communication with the output device, on the other hand, the filtering module refuses transmission of data. This arrangement effectively prevents the security level of the output device from being lowered. The technique of the present invention thus ensures the sufficient level of security in output via the network, while enhancing the utility of output.

As a second construction, the security system of the present invention includes a filtering module, a specification information fetching module, and a control module. The filtering module in the second construction exerts the same functions as those of the filtering module in the first construction.

The specification information fetching module fetches specification information for specifying an output requirement, which is transmitted from the external network to the output device, via the output device through direct communication between a client that gives the output requirement and the output device.

The control module controls the filtering module to permit transmission of an output requirement that meets the specification information. The second construction also remits the security level of output under the restrictive condition that the direct communication is established between the client and the output device.

In the second construction, the specification information may be identification information assigned to the output requirement. Typical examples of the identification information include a job number assigned to the output requirement, a file name for specifying a content of interest to be output, and a URL (Uniform Resource Locator) of the content of interest. In order to assure the sufficient level of security, it is desirable that the identification information is intrinsic to the output requirement.

The specification information may alternatively be identification information for specifying the client as the transmitter of the output requirement. This identification information is, for example, address information used for communication by the client.

The output requirement represents a series of data transmitted for execution of output. There are at least two different applications of supplying data to the output device in the output process via the network. In the first application, the client transmits output data to the output device. In the second application, the client issues an output requirement including the location of a content of interest to be output, and either the output device or an output mediation server that mediates the output requirement fetches the specified content of interest for output. One typical construction of the output mediation server includes: an input module that receives an output requirement sent from a client, a fetching module that fetches a specified content of interest from the client, and a transmission module that transmits the output requirement to an output device specified by the client. When the output mediation server functions to fetch the content of interest, the output requirement is converted from the format specifying the location of output data into a substantive content. In the specification hereof, the term 'output requirement' includes such conversion and represents a series of data that substantially specify the details of the output.

As mentioned above, the technique of the present invention is applicable to the system where the output requirement is transmitted to the output device via the output mediation server connecting with the network. In this system, the specification information may be identification information for specifying the output mediation server as the direct transmitter of the output requirement to the output device. This identification information is, for example, address information of the output mediation server.

In the second construction of the present invention, it is preferable that the control module remits the security level only while the direct communication is established between the client and the output device. The filtering module refuses transmission of the output requirement sent from the client when the client fails in establishing direct communication with the output device. This arrangement also ensures the sufficient level of security in output via the network, while enhancing the utility of output.

As a third construction, the security system of the present invention includes a filtering module, a specification information fetching module, and a condition transmission module. The third construction is preferably applicable to output via the output mediation server.

Like the first construction and the second construction, the filtering module in the third construction rejects transmission of data, which is sent from the external network but does not satisfy a predetermined bypass condition. Like the second construction, the specification information fetching module fetches specification information via the output device. The specification information may be any of the diverse information enumerated above with regard to the second construction.

When the specification information is fetched, the condition transmission module maps the specification information to the bypass condition and transmits the mapped bypass condition to the output mediation server. The transmitted bypass condition includes, for example, a password for bypassing the security system.

The output mediation server inputs an instruction with regard to the output requirement from the client, while inputting the specification information and the bypass condition from the security system. The output mediation server prepares an output requirement specified by the specification information in a certain state fulfilling the bypass condition and transmits the output requirement to the security system. The preparation includes, for example, conversion of the content specified by the output requirement to a content with a password specified by the security system.

In the third construction of the present invention, the cooperation of the security system with the output mediation server attains both the enhanced utility of output and the sufficient level of security. The bypass condition transmitted from the security system is, in principle, not leaked out from the output mediation server. This arrangement thus effectively prevents the security level from being lowered unintentionally.

In the third construction, it is preferable that the bypass condition is held only while the direct communication is established between the client and the output device. One applicable procedure sets a temporary password including the specification information.

As a fourth construction, the security system of the present invention includes a filtering module, a specification information fetching module, and an output requirement acquisition module. The filtering module and the specification information fetching module exert the same functions as those of the filtering module and the specification information fetching module in the second construction. The specification information may be any of the diverse information enumerated above with regard to the second construction. In the fourth construction, the specification information includes at least information representing the location of registration of the output requirement on the network.

When the specification information is fetched, the output requirement acquisition module acquires the output requirement from the location specified by the specification information in such a manner that bypasses the refusal by the filtering module. The fourth construction fetches the output requirement through the pull-type transmission. The output requirement may be fetched from the client, the output mediation server, or a Web server that provides contents. In the fourth construction, the security system fetches the output requirement through the pull-type transmission and thus carries out the output without lowering the security level.

In the fourth construction, for more effective assurance of the sufficient security level, it is preferable that the output requirement acquisition module carries out the acquisition only while the direct communication is established between the client and the output device.

In the respective constructions of the present invention described above, the security level is restrictively remitted, based on the information fetched through the direct communication between the output device and the client. Another application of the present invention is accordingly an output device having such a communication function as a sub-combination of each of the security systems discussed above.

The output device includes a communication module that establishes direct communication with a client, which gives the output requirement; a fetching module that activates the communication module to fetch specification information for specifying the output requirement, which is transmitted from the external network to the output device; and a transmission module that transmits the specification information to the security system.

In order to ensure the sufficient level of security, it is preferable that the communication module has a communicable range that is restricted to be within a predetermined distance from the output device. Infrared ray or feeble radio wave may be utilized for the communication. As an example of the feeble radio wave, Bluetooth (trade mark) is applicable for the communication.

In the output device, the communication module may be activated to transmit bypass information required for bypassing the security system to the client. The bypass information is, for example, a password for bypassing the security system. The client outputs the output requirement with this password to bypass the security system and carry out printing. It is desirable that the communication of the client with the output device is carried out in a certain form that keeps secrecy. In the system of outputting data via the output mediation server discussed above, it is preferable that the bypass information transmitted from the client is deleted after transmission of the output requirement. One effective measure for the enhanced assurance of the security changes the bypass information for every output requirement.

In the above application, the bypass information may be information intrinsic to the output device. This arrangement enables specification of the output device to be carried out simultaneously with acquisition of the bypass information, thus further enhancing the utility.

The technique of the present invention is not restricted to the applications of the security system and the output device, but may be actualized by a diversity of other applications, such as corresponding security method and output method via the network. The other applications also include computer programs that cause the computer to attain these methods, a diversity of signals equivalent to the computer programs, and recording media in which such computer programs are recorded.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
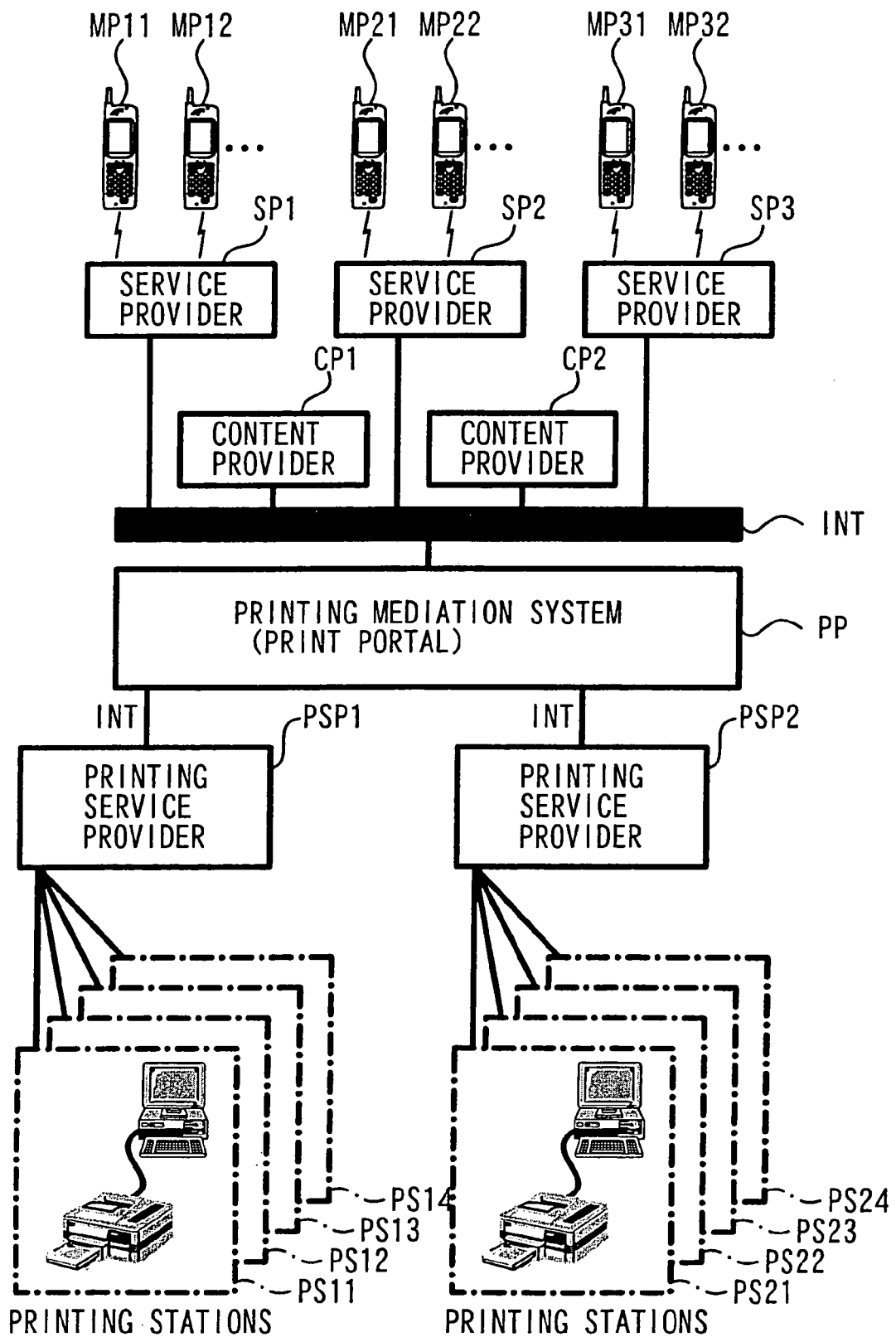
FIG. 1 illustrates the general architecture of a printing system.

Some modes of carrying out the present invention are discussed below as embodiments of a printing system via a network.
A. Basic System Architecture
   A1. Overview of System
   A2. Functionality
   A3. Configuration of Functional Blocks
B. Security System
C. Security Control
D. Second Embodiment
E. Third Embodiment
F. Fourth Embodiment
G. Modifications A. Basic System Architecture A1. Overview of System FIG. 1 illustrates the general architecture of a printing system. This embodiment regards the system that executes printing via the Internet. The similar architecture may be applicable to relatively limited network environments, such as LAN (Local Area Network) and computer communication.

In the system of this embodiment, a diversity of servers and clients are connected to the Internet INT. For convenience of explanation, the connection is shown in a hierarchical manner, but the respective constituents enable mutual transmission of information via the Internet INT. For clarity of illustration and explanation, only a limited number of constituents are shown, although there is no limit of in number of connections. The technique of the embodiment executes a printing operation with an arbitrary printer under the system architecture including a large number of servers and clients connected with one another via the Internet INT.

This embodiment uses, as the clients, mobile phones MP11, MP12, MP21, MP22, MP31, MP32 having the access functionality to the Internet. Each of these mobile phones, for example, MP11 gains access to the Internet via any of service providers SP1, SP2, and SP3. The clients are not restricted to the mobile phones but may be personal computers.

Content providers CP1 and CP2 are also connected to the Internet INT. In the system of this embodiment, these content providers, for example, CP1, provide contents to be printed. The content providers include Web page providers on the Internet INT.

In the system of this embodiment, printing stations, for example, PS11, are output resources. The printing stations like PS11 represent printers that enable transmission of data via the Internet. The printing station is constructed, for example, by combining a computer connected to the Internet with a printer locally connected to the computer. The printing stations may be located in rather private spaces with relatively limited users like individual houses and offices or in rather public spaces like stores and hotels. A security system may be interposed between the printing service provider and the printing station. The details of the security system will be discussed later.

In the system of this embodiment, in response to an instruction from the client MP11, contents provided by the content provider CP1 are transmitted to the printing station, which executes an actual printing operation. Two different-layered servers, that is, upper-layer and lower-layer servers, mediate data between the clients and the printing stations.

In the illustrated example, the upper-layer server is a printing mediation system (print portal) PP, and the lower-layer servers are printing service providers PSP1 and PSP2.

The lower-layer servers, such as the printing service provider PSP1, function to manage the printing stations like PS11. In the illustrated example, the printing service provider PSP1 manages printing stations PS11 to PS14, whereas the printing service provider PSP2 manages printing stations PS21 to PS24. In the case where the printing stations like PS11 are located in individual stores, for example, the respective printing service providers PSP1 may be owned by different business proprietors. A business proprietor A owns the printing service provider PSP1 and manages the printing stations PS11 to PS14 located in its head quarter and branch shops. A business proprietor B owns the printing service provider PSP2 and manages the printing stations PS21 to PS24. Such arrangement enables each business proprietor to manage its own printing stations and supply unique services relating to the mediation of print data, for example, discount service.

The upper-layer server, that is, the print portal PP, manages the printing service providers PSP1 and PSP2. The print portal PP thus indirectly manages the printing stations like PS11 via the printing service providers PSP1 and PSP2. The upper-layer server provides common functionality even when the printing service providers PS1 and PS2 are run by the different business proprietors. For example, the upper-layer server provides a standard interface in response to a print request from the client MP11. This desirably enhances the utility of the users.

The upper-layer server and the lower-layer server are functionally parted from each other, and each server may not be constructed as a single server. The functionality of the upper-layer server and the lower-layer server discussed below may be distributed into multiple servers.

A2. Functionality

The internal structure of each constituent included in the system of the embodiment will be discussed later. In order to elucidate the functionality of the servers and the other constituents, the following description regards a concrete example of printing E mails utilizing the print portal. Here it is assumed that a security system is constructed to allow each printing station to unconditionally accept communication from the printing service provider. The system of higher security will be discussed later.

Figure 2:
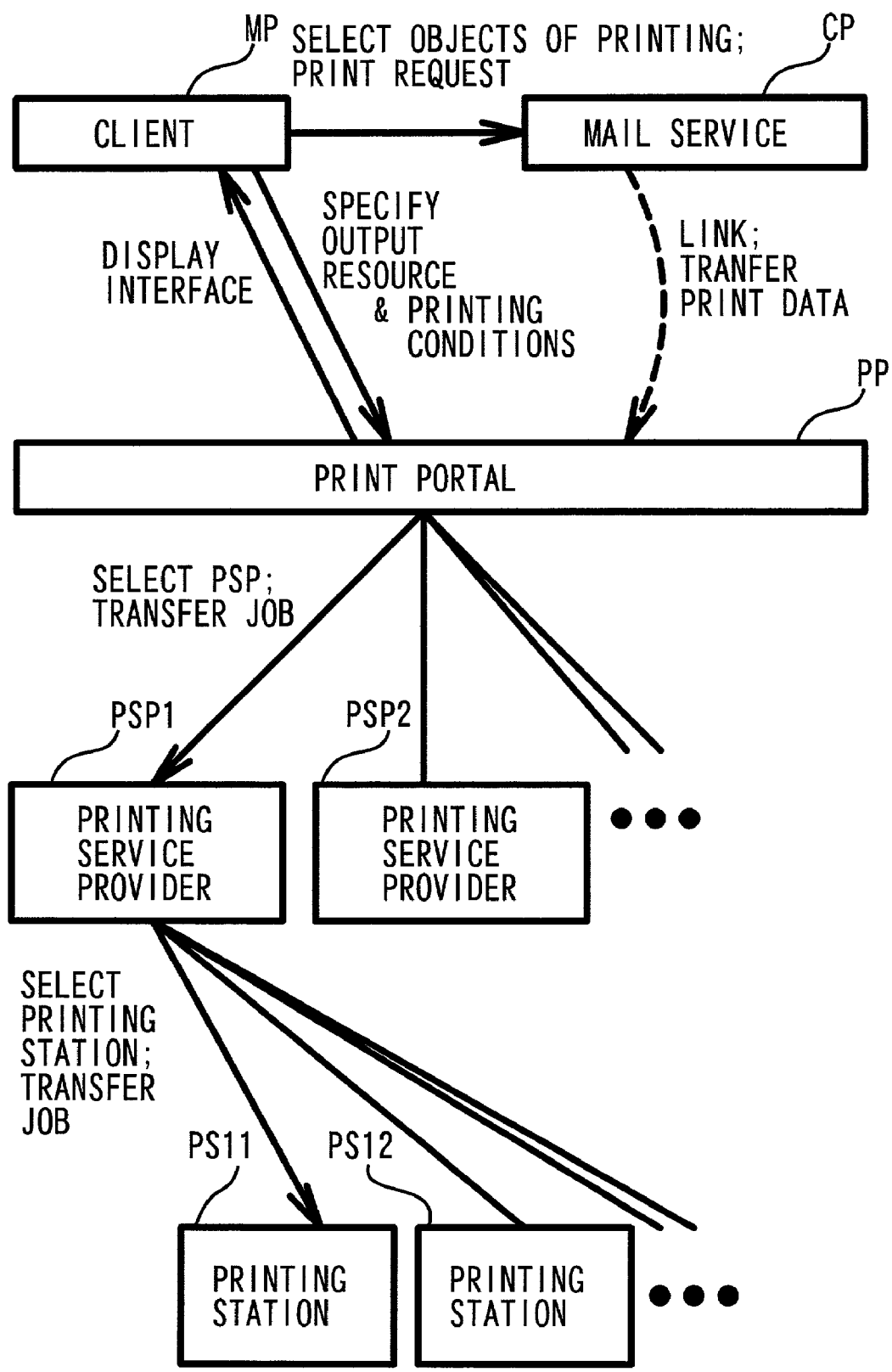
FIG. 2 shows flow of data in the process of printing E mails.
Figure 3:
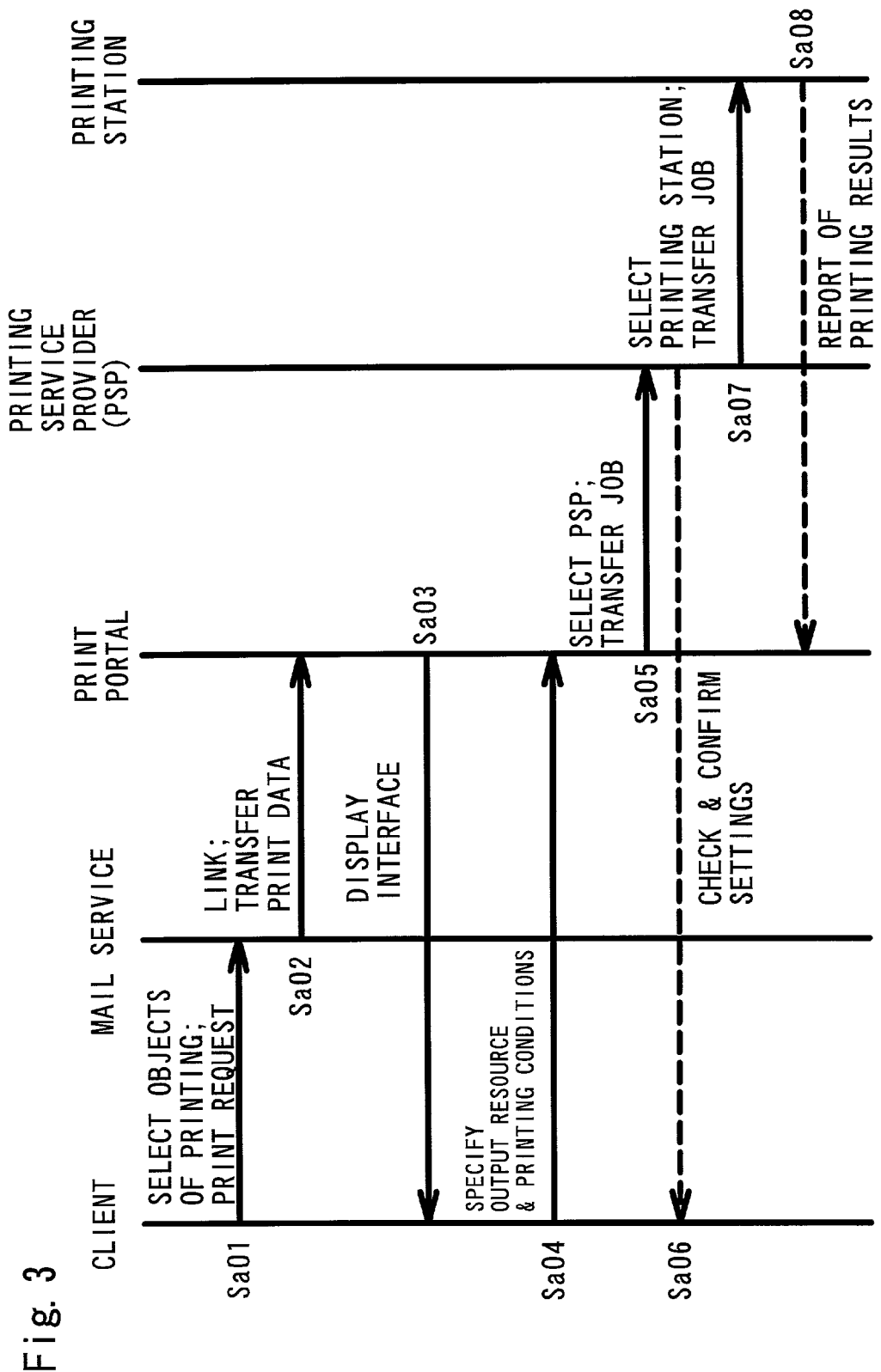
FIG. 3 is a time chart in the process of printing E mails.
Figure 4:
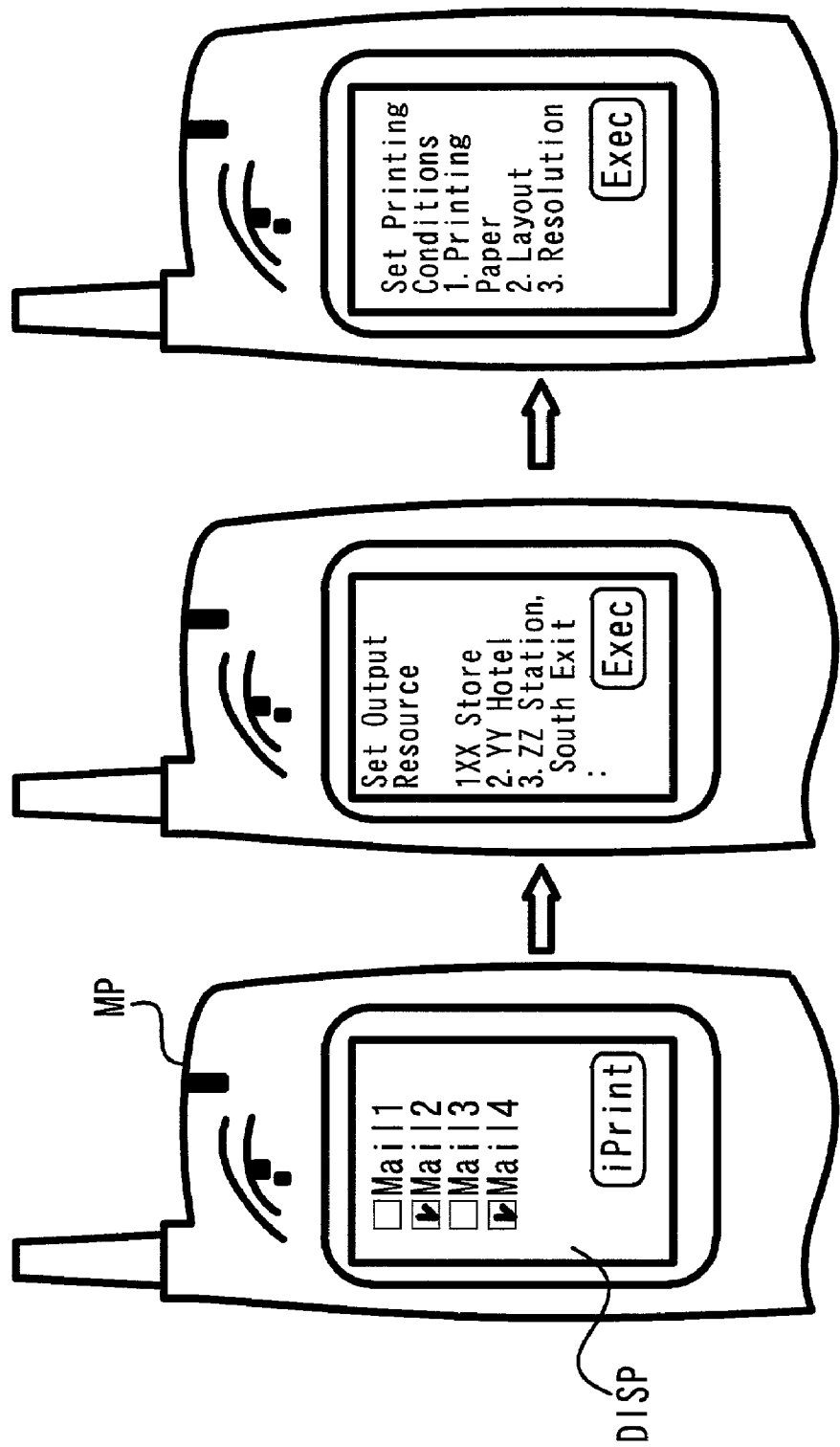
FIG. 4 shows an exemplified interface in the process of printing E mails.

FIG. 2 shows flow of data in the process of printing E mails. FIG. 3 is a time chart in the process of printing E mails. FIG. 4 shows an exemplified interface in the process of printing E mails. The functionality of the respective units is discussed with referring to these drawings. In the case of E mails, a mail service CP corresponds to a content provider.

The user first gains access from a client MP to the mail service CP, checks E mails addressed to the user, and selects one or plural mails to be printed. A series of interface windows appearing on a display unit DISP of the mobile phone is shown in FIG. 4. The left-side window shows that there are four mails Mail 1 to Mail 4 addressed to the user and that Mail 2 and Mail 4 have been selected as objects of printing. This interface is provided by the mail service CP. When the user presses a button 'iPrint' on the window, a requirement for execution of printing is transmitted from the mail service CP to the print portal PP (see Sa01 in FIG. 3 and FIG. 2).

When the mail service CP is registered in advance as a content provider in the print portal PP, the button 'iPrint' appears on the window. This button functions as a link to the print portal PP. In response to the requirement for printing by a press of the 'iPrint' button, the destination of access by the client MP is changed to the print portal PP. Print data, that is, data of Mail 2 and Mail 4, is then transmitted from the mail service CP to the print portal PP (see Sa02 in FIG. 3 and FIG. 2).

The print portal PP subsequently provides the client MP with interfaces for specifying the output resource and printing conditions (see Sa03 in FIG. 3 and FIG. 2).

The center drawing of FIG. 4 shows an interface window for designating the output resource. Available printing stations are enumerated for the designation of the output resource. The list of the available output resources may be displayed in a hierarchical manner. For example, when the user selects 'XX Store' in the list shown in FIG. 4, all shops belonging to the XX Store chain are enumerated. One modified procedure may cause the user to select one among available printing service providers on the first stage of the hierarchical designation.

The right-side drawing of FIG. 4 shows an interface window for specifying the printing conditions. Typical examples of the printing conditions include the paper size, the layout, and the resolution. Selection of a 'Printing Paper' menu enables the detailed settings for the printing paper, for example, the size A4 or B5. Selection of a 'Layout' menu enables the detailed settings for the layout, for example, 1 page/sheet or 2 pages/sheet. Selection of other menus enables the detailed settings for other printing conditions. The settings of printing are not restricted to this example, but a diversity of fields may be provided by taking into account the utility.

When the user completes the specification of the output resource and the printing conditions with the above interface, the specified information is transmitted to the print portal PP (see SaO4 in FIG. 3 and FIG. 2). The print portal PP selects the printing service provider PSP1 as the destination of transmission of a print job, based on the received information, and transfers the print job to the selected printing service provider PSP1 (see Sa05 in FIG. 3 and FIG. 2). Here the printing service provider PSP1, which manages the printing station PS11 designated by the user as the output resource, is selected as the destination of transmission of the print job.

The printing service provider PSP1 that has received the print job selects the printing station PS11 and transfers the print job to the selected printing station PS11 (see Sa07 in FIG. 3 and FIG. 2). Here the printing station PS11 designated by the user is selected as the destination of transmission.

The print data is converted to a PDF (Portable Document Format) file, which is a general purpose format, in the course of mediation with the print portal PP and the printing service provider PSP1. The PDF file is generated as a coded file using a preset password for enhanced security in the process of printing mediation. The details of the file conversion process will be discussed later. The printing station PS11 analyzes the PDF file and executes a printing operation.

As shown by Sa06 in FIG. 3, a display including the designated output resource and the specified printing conditions may be given to the client MP for the purpose of check and confirmation, prior to the transfer of the print job from the printing service provider PSP1 to the printing station PS11.

On completion of the printing operation, a report of printing results may be transmitted from the printing station PS11 to the print portal PP. The print portal PP detects the normal completion of the printing operation based on the report, and carries out post services like accounting.

The above example mediates printing with the two different layered servers, that is, the print portal PP as the upper-layer server and the printing service providers like PSP1 as the lower-layer servers. The use of the two-layered servers for the mediation has advantages discussed below.

The lower-layer server may be organized by each business line, in order to provide unique services characteristic of the business line and allow discrimination from other business proprietors. Each business proprietor can rather readily take in the users and the content providers registered with the print portal PP as the potential customers of its business line.

Even when the lower-layer servers are individually organized by different business lines, the upper-layer server provides the users with a standard interface. This enhances the utility of the print portal.

The user who has been registered with the print portal PP can readily utilize a diversity of lower-layer servers under the control of the print portal PP. This arrangement does not require time-consuming, complicated registration and other related work for each lower-layer server, thus enhancing the utility. The content providers share such advantages. The content provider that has been registered with the print portal PP can readily increase in number the users and the output resources of the offered contents.

The printing mediation system is not restricted to the construction utilizing the two-layered servers, but may be organized by a single-layer server configuration having the combined functions of the print portal and the printing service providers.

A3. Configuration of Functional Blocks

Figure 5:
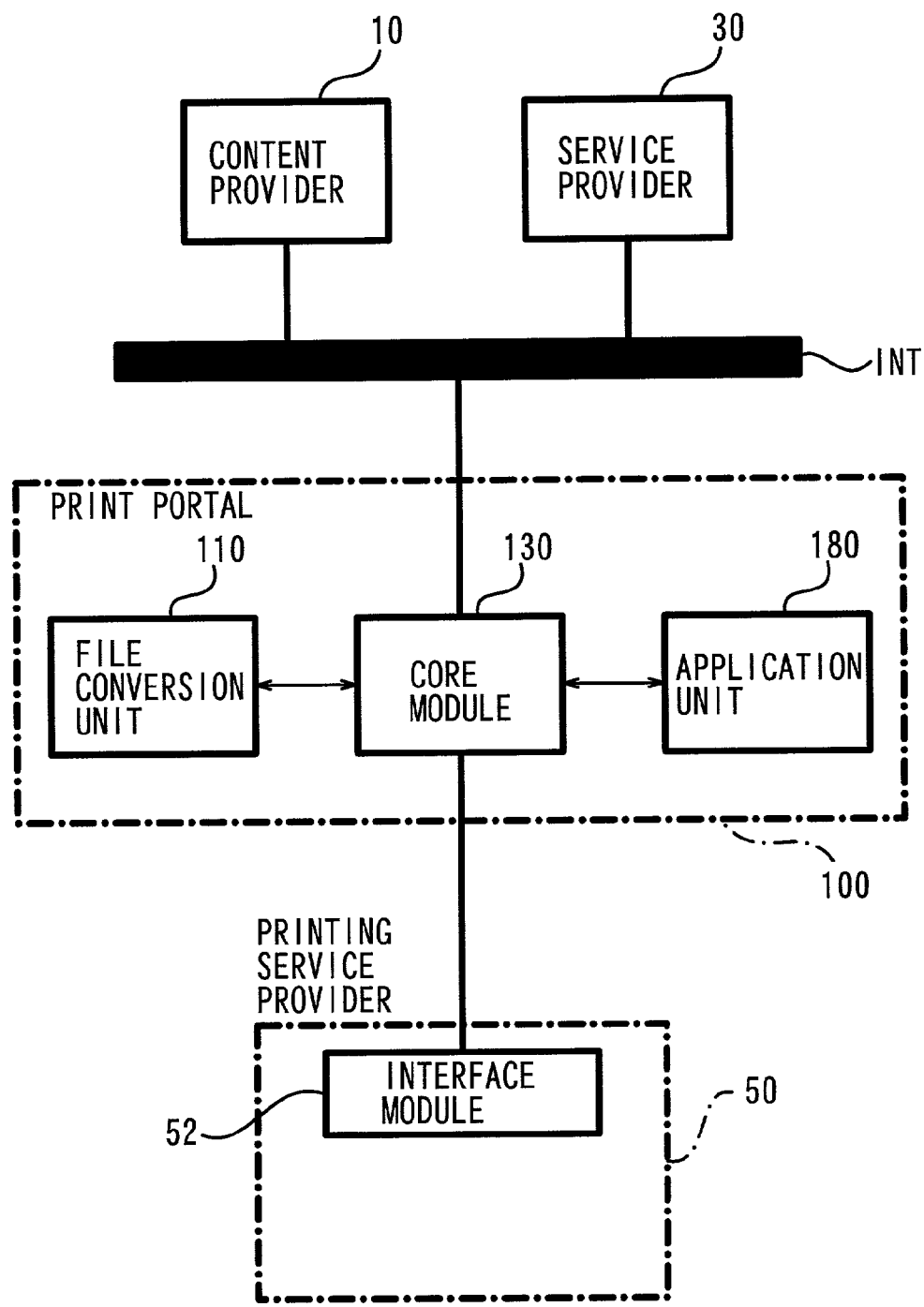
FIG. 5 shows functional blocks of a print portal.

FIG. 5 shows functional blocks of the print portal. For convenience of explanation, the respective constituents are expressed by numbers different from the symbols of FIG. 1, although the constituents of the identical names have the same functions.

As illustrated, a print portal 100 mainly includes three functional blocks, a core module 130, a file conversion unit 110, and an application unit 180. In this embodiment, these functional blocks are attained by the software.

The file conversion unit 110 converts the format of print data to a predetermined intermediate file in the course of mediation of the print data. The PDF is used as the general purpose format in this embodiment.

The application unit 180 executes the main functions of the print portal 100 to mediate the print data and a diversity of additional functions.

The core module 130 cooperates with the file conversion unit 110 and the application unit 180 to mediate the print data. The core module 130 takes charge of communication with a content provider 10, a service provider 30, and a printing service provider 50. The printing service provider 50 has an interface module 52 to ensure the flexibility of a protocol in connection with the print portal 100.

Figure 6:
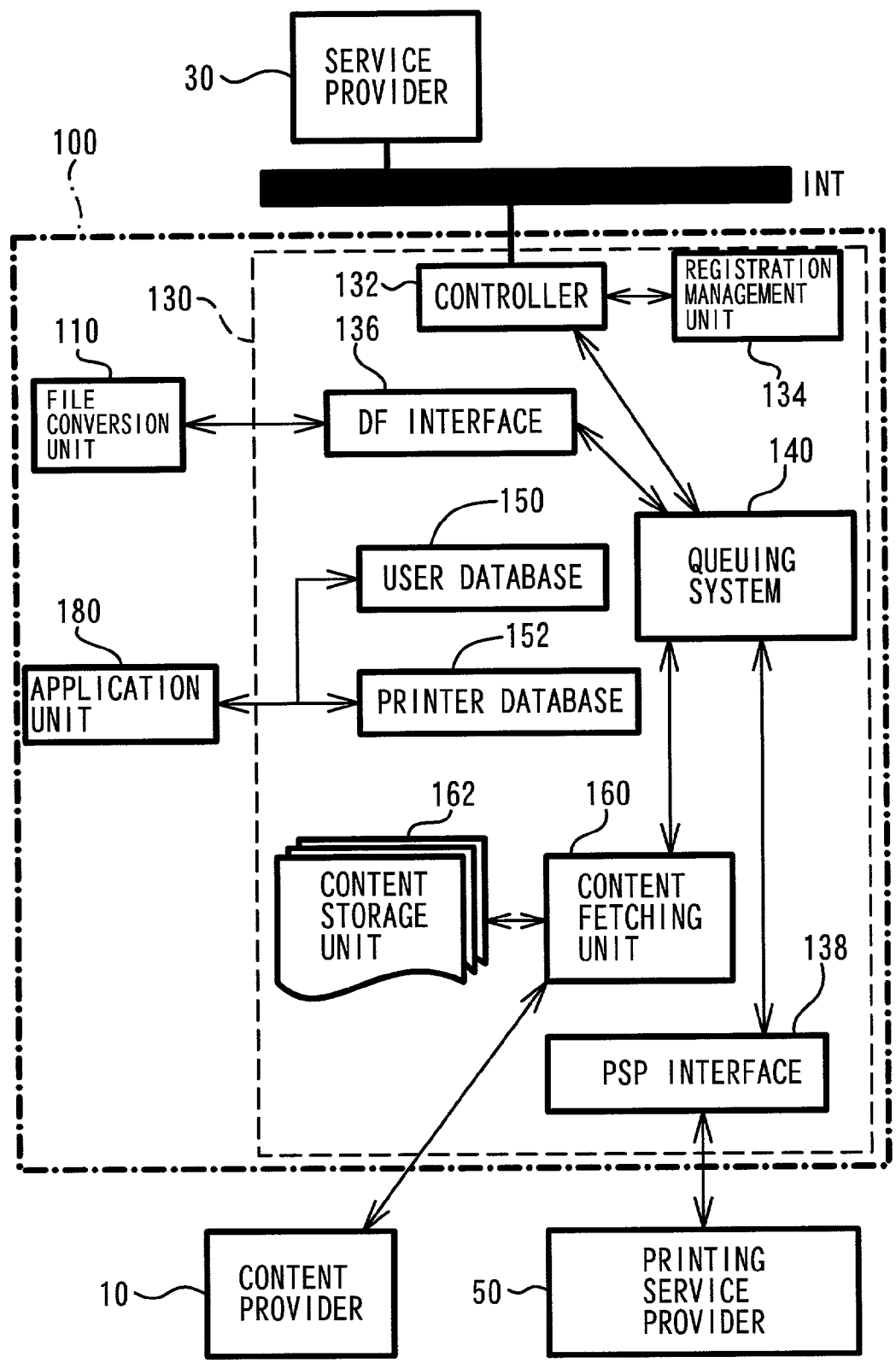
FIG. 6 illustrates the internal structure of a core module 130.

FIG. 6 illustrates the internal structure of the core module 130. This internal structure is only illustrative, and the core module 130 may have any of other diverse constructions.

A controller 132 controls the operations of the respective functional blocks of the print portal 100 and transmission of information to and from the outside via the internet INT. The control includes registration and management of users and providers, control of the status of print jobs, acceptance and cancellation of print requests, and retrieval of printers as the output resource. The controller 132 also provides an interface window to allow transmission of data between the print portal 100 and the outside.

A registration management unit 134 takes charge of registration and management of the user utilizing the print portal 100, the content provider 10, and the printing service provider 50. The registration management unit 134 creates an interface window for the registration and management and stores and updates registration-related data in a predetermined data base.

A queuing system 140 relays the operations of the respective functional blocks. In this embodiment, the respective functional blocks are constructed by the object-oriented software. Each functional block refers to a message registered in the queuing system 140, detects the presence of a job to be processed, and executes the actual processing. On completion of the processing, a message representing conclusion of the processing is registered in the queuing system 140. The respective functional blocks execute the processing with the queuing system 140 as the relay. The print portal 100 accordingly actualizes a series of processing, from acceptance of a print request to completion of a printing operation.

In order to attain the series of processing, the queuing system 140 has a content fetching queue, a file conversion queue, a job sending queue, and a job canceling queue.

A content fetching unit 160 gains access to the content provider 10 and fetches a content specified by the user as an object of printing. The fetched content is temporarily stored in a content storage unit 162. The content fetching unit 160 refers to the content fetching queue provided in the queuing system 140 and performs the above operation according to the message accumulated in the content fetching queue. After fetching the content, the content fetching unit 160 registers a message to require file conversion of the content in the fine conversion queue provided in the queuing system 140.

The file conversion unit 110 functions to convert the content to the PDF format. Coding with a preset password is also performed in this conversion process. Even when the content is a PDF file, the file conversion unit 110 carries out coding and reconversion to the PDF format. The PDF is the general purpose format. Conversion of the print data to this format advantageously enables output of the print data to a diversity of printers. Another advantage is relatively accurate reproduction of the selected layout in prints. The PDF allows conversion from practically any print data including documents and pictures, so that a wide range of contents can be the object of printing. A page description language, such as Postscript (registered trademark), may alternatively be used as the general purpose format.

In the structure of this embodiment, with a view to relieving the load applied to each server, the file conversion unit 110 is constructed as a separate server from the core module 130. The core module 130 accordingly has a DF interface 136 to allow transmission of data to and from the file conversion unit 110.

The DF interface 136 transfers data to the file conversion unit 110, in response to the message accumulated in the file conversion queue provided in the queuing system 140. When receiving a processed PDF file from the file conversion unit 110, the DF interface 136 registers a message of print job transmission in the job sending queue provided in the queuing system 140. One possible modification omits the DF interface 136 and constructs the file conversion unit 110 to gain direct access to the queuing system 140.

A PSP interface 138 functions to transmit a print job to the printing service provider 50. More specifically, the PSP interface 138 transmits a print job to the designated printing service provider 50, in response to the message accumulated in the job sending queue provided in the queuing system 140. The PSP interface 138 also sends a message of job cancellation accumulated in the job canceling queue. The transmission is attained according to a diversity of protocols set by the printing service provider 50, for example, HTTP (Hypertext Transport Protocol).

The core module 130 includes a diversity of databases, such as a user database 150 and a printer database 152. Although only two databases are illustrated in this embodiment, a greater number of databases may be provided in the core module 130. The registration management unit 134 manages these databases. The databases are utilized for the processing executed in the core module 130, as well as for the processing executed by the application unit 180.

The user database 150 includes files provided for the respective users of the print portal 100. Each file stores user-related attribute information, for example, the user name and the user ID. The printer database 152 has registration of attribute information with regard to the respective printers, for example, the printer name and the ID number. The ID number represents an index utilized to identify the printer in the printing process with the print portal 100.

The system of the embodiment having the construction discussed above carries out the printing process discussed above with reference to FIGS. 2 through 4.

B. Security System

Figure 7:
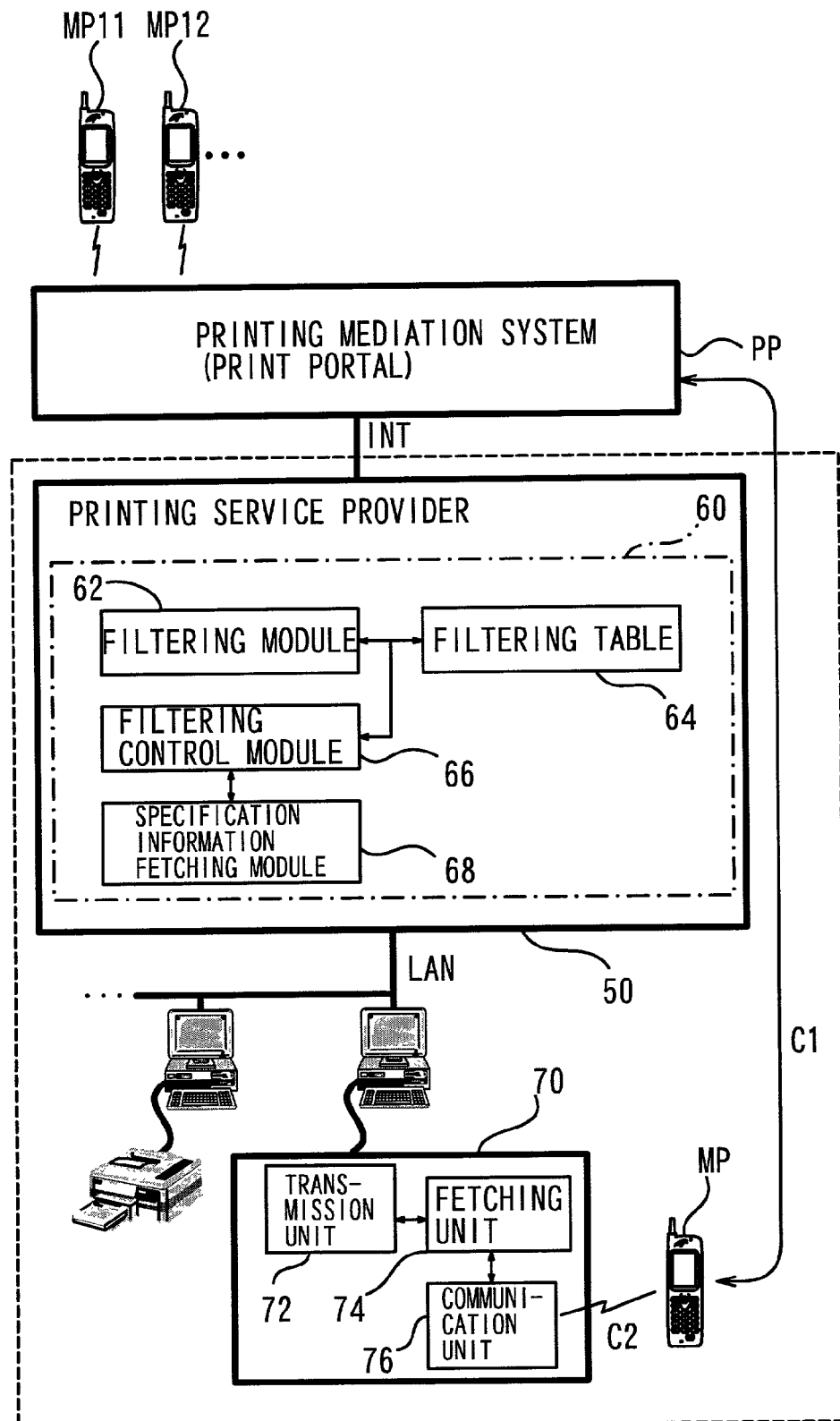
FIG. 7 illustrates the structure of a security system in a first embodiment of the present invention.

The following describes the system of higher security. FIG. 7 illustrates the structure of a security system in this embodiment. A security system 60 is constructed by software in the printing service provider 50.

In the illustrated example, the printing service provider 50 and the respective printing stations (the part surrounded by the broken line) are constructed in the office. The respective printing stations are connected to the security system 60 via a local area network LAN. The security system 60 is connected to the print portal PP via the Internet INT.

The security system 60 has functional blocks illustrated in FIG. 7 and works to limit data transmission between inside and outside of the office via the local area network LAN and the Internet INT. A filtering module 62 carries out a filtering process that analyzes header information of a packet sent to the security system 60 and gives either a permission or refusal of transmission. The permission or refusal of transmission depends upon conditions set in a filtering table 64. In principle, the refusal of transmission is given even to a packet sent from the print portal PP.

A filtering control module 66 modifies the settings in the filtering table 64 and thereby controls the filtering process. The control is carried out, based on information given by a specification information fetching module 68.

The specification information fetching module 68 functions to fetch specification information from the client MP via a printer 70 of the printing station. The specification information represents a certain piece of information that is used to specify a printing requirement given by the client MP. In this embodiment, 'address information' of the client MP is used as the specification information.

The specification information is fetched on the following path. As illustrated in FIG. 7, the printer 70 of this embodiment has a communication unit 76 that establishes direct communication C2 with the client MP. For example, Bluetooth or infrared ray may be utilized for the direct communication. In another example, the printer 70 is provided with a connector for connection with the client MP. Such direct communication is established in the case where the client MP is relatively close to the printer 70. Establishment of this communication accordingly proves that there is a client MP close to the printer 70, that is, in the office where the printer 70 is installed.

The printer 70 is also provided with a fetching unit 74. The fetching unit 74 controls the communication unit 76 and detects any client MP that is capable of establishing the communication C2 at regular intervals. In response to detection of the client MP, the fetching unit 74 fetches the address information, which the client MP uses for printing with the print portal PP, via the communication unit 76. The fetched address information is transmitted to the specification information fetching module 68 of the security system 60 via a transmission unit 72 through the local area network LAN.

When the specification information fetching module 68 transfers the fetched address information to the filtering control module 66, the filtering control module 66 modifies the settings in the filtering table 64 to allow transmission of a packet sent from an address specified by the address information. The printing requirement output from the client MP to the print portal PP through the communication C1 is then transmitted through the security system 60 and given to the printer 70, which implements an actual printing operation corresponding to the printing requirement.

C. Security Control

Figure 8:
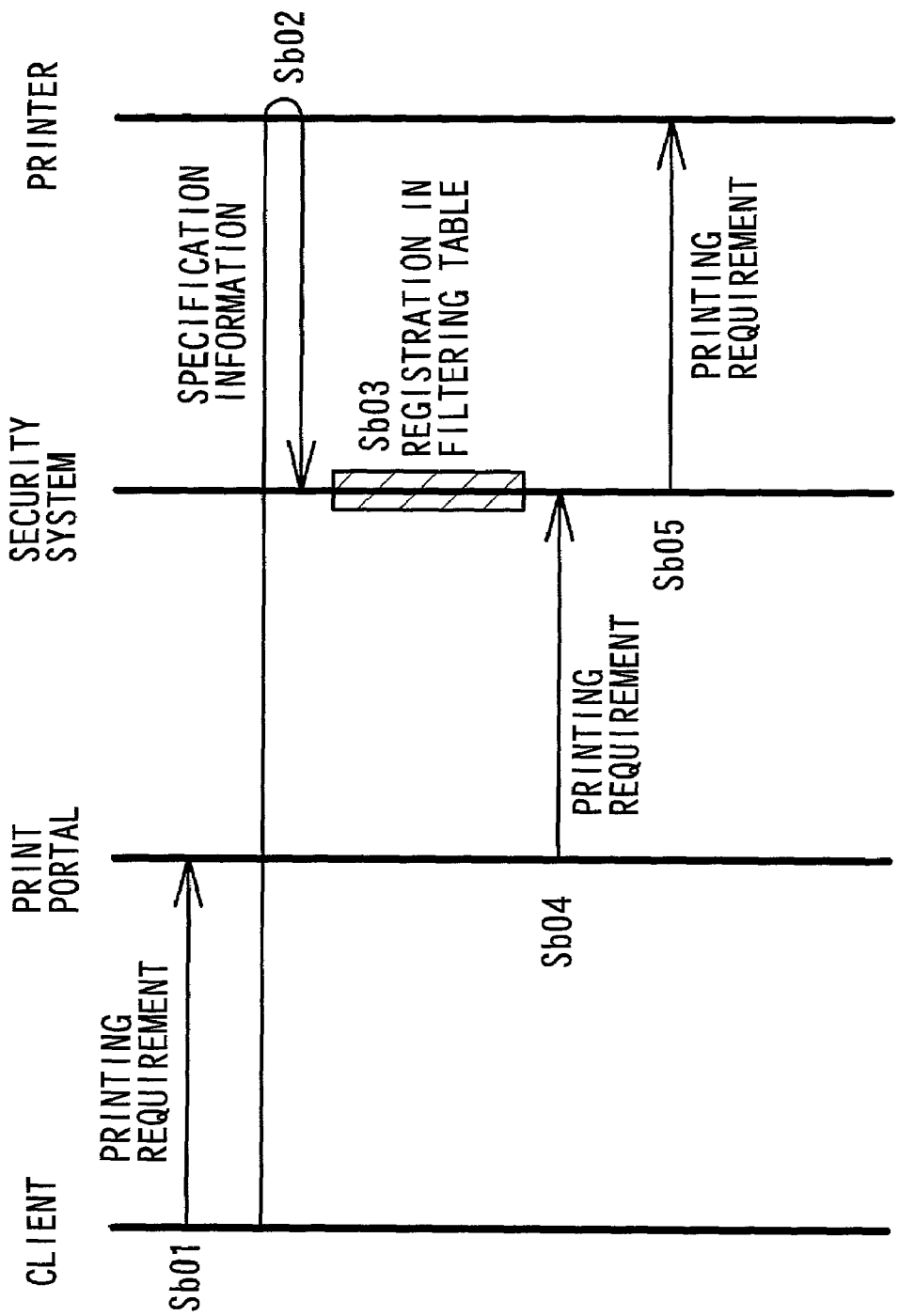
FIG. 8 shows a sequence of printing with a printer in an office in the first embodiment.

FIG. 8 shows a sequence of printing with the printer in the office in this embodiment. In the illustrated example, the client MP utilizes the functions of the security system 60 and the printer 70 for printing.

The client MP outputs a printing requirement to the print portal PP (step Sb01). In the case where the client MP is located near to the printer 70, the direct communication C2 is established simultaneously between the printer 70 and the client MP. The printer 70 fetches the specification information from the client MP and transmits the fetched specification information to the security system 60 according to the procedure discussed above with reference to FIG. 7 (step Sb02).

The security system 60 carries out registration into the filtering table 64 by a series of processing discussed below (step Sb03), so as to allow transmission of a packet that meets the specification information.

Figure 9:
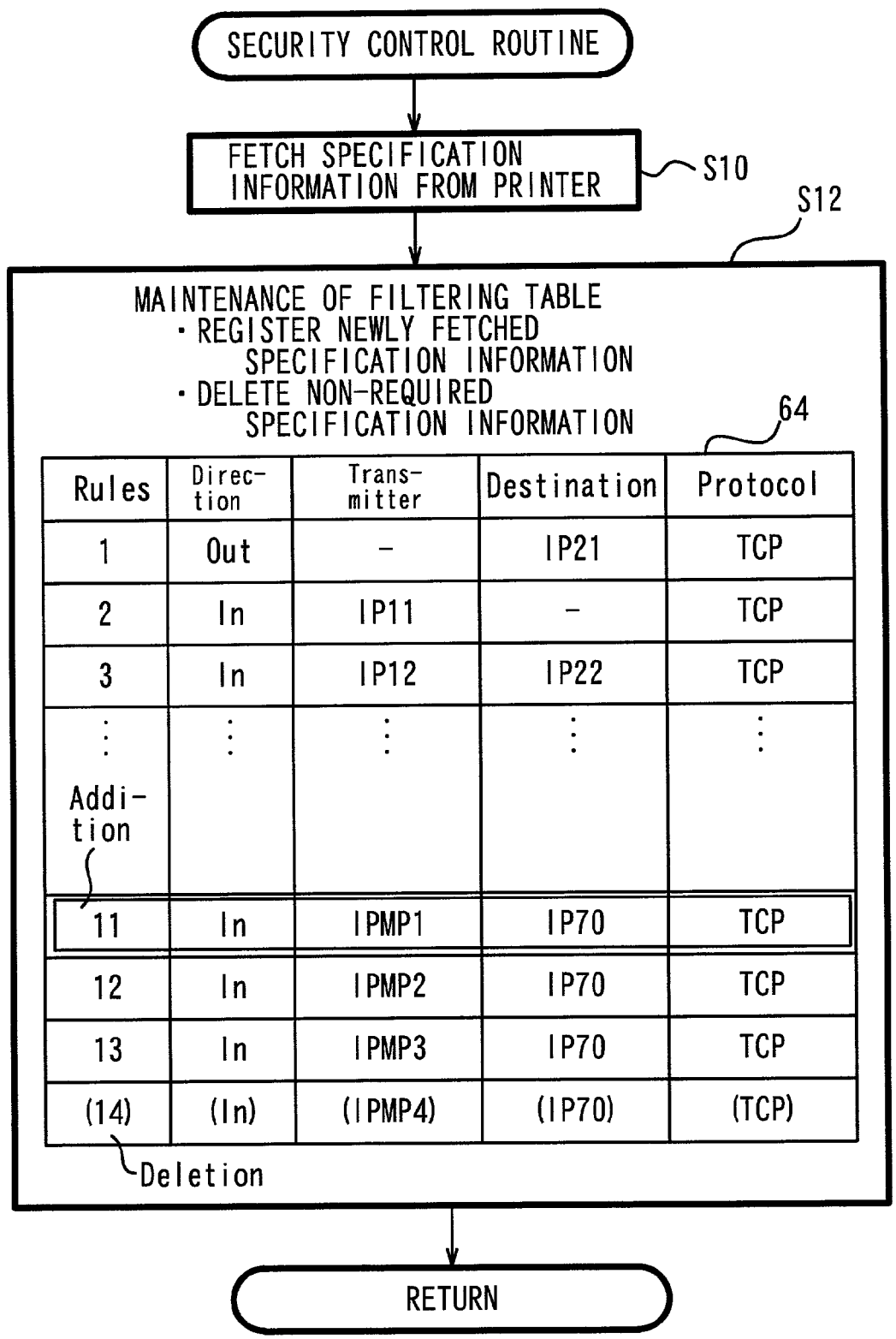
FIG. 9 is a flowchart showing a security control routine.

FIG. 9 is a flowchart showing a security control routine, which is iteratively executed by the security system 60. As mentioned previously, the security system 60 fetches the specification information from each printer at step S10. As a large number of printers are connected to the local area network LAN, the security system 60 fetches many pieces of the specification information.

The security system 60 then carries out maintenance of the filtering table 64, based on the specification information at step S12. In the case where any new piece of the specification information is detected, the new piece of information is registered in the filtering table 64. In the case where no specification information is detected corresponding to one of the existing settings in the filtering table 64, on the contrary, the non-required piece of the specification information is deleted.

The settings of the filtering table 64 are shown in FIG. 9 as an example. In order to assure the sufficient level of security in the office, several rules with regard to filtering are registered in the filtering table 64. For example, the registration in Rule 1 allows a packet to be transmitted from the office when the address of the destination is IP21 and the adopted protocol is TCP. The registration in Rule 2 allows a packet to be transmitted to the office when the address of the transmitter is IP11 and the adopted protocol is TCP. In this manner, transmission of each packet is limited according to the settings of registration, for example, with regard to the transmitter, the destination, and the protocol.

In the structure of this embodiment, rules based on the specification information fetched from the client MP may be registered temporarily, in addition to fixed rules. For clear distinction from the fixed rules, the temporary rules are registered on and after Rule 11.

Here it is assumed that the security system 60 fetches address information IPMP1 of a client via the printer 70 as a new piece of the specification information. The security system 60 adds this address information to the registration as shown by Rule 11. The registration in Rule 11 allows a packet to be transmitted to the office when the packet is sent from this address IPMP1 and the destination is the address IP70 of the printer 70. Specification of the destination may be omitted.

Two additional pieces of address information IPMP2 and IPMP3 are further fetched as the specification information. Since the newly fetched specification information is not necessarily a new piece of the specification information, the security system 60 retrieves the registration in the filtering table 64. When these newly fetched pieces of address information have already been registered in Rules 12 and 13 in any previous cycle of the processing, the security system 60 keeps the registration of these rules without any change.

There is a possibility, on the other hand, that no specification information is detected corresponding to each of the registered rules in the filtering table 64. The specification information is not fetched when the client is apart from the printer to fail in establishment of the direct communication therebetween. The security system 60 deletes the non-required rule from the filtering table 64 in response to non-detection of the corresponding specification information. More specifically, the security system 60 retrieves any rule corresponding to the non-detected specification information among the rules registered in the filtering table 64 and deletes the retrieved rule. For example, in the case of no detection of specification information IPMP4 corresponding to Rule 14, the security system 60 determines that Rule 14 is unnecessary and deletes the registration of Rule 14.

The above series of processing modifies the settings in the filtering table 64 to allow transmission of the packet sent from the client that succeeds in establishing direct communication with the printer but to refuse transmission of the packet sent from the client that fails in establishing the direct communication with the printer.

Referring back to FIG. 8, when registration in the filtering table 64 has been completed, the print portal PP transmits the printing requirement to the security system 60 (step Sb04). The printing requirement includes address information of the client as the transmitter.

The security system 60 analyzes the input packet to extract the address information of the transmitter. This address information is registered in the filtering table 64 as the specification information to allow transmission, so that the security system 60 allows transmission of the input packet. The printing requirement is accordingly transferred to the printer 70, which then implements the actual printing operation corresponding to the printing requirement (step Sb05).

In the construction of the embodiment discussed above, the security system 60 effectively works to prevent illegal accesses to the printer in the office. When the client is located near to the printer, however, the security system 60 allows transmission of a printing requirement sent from the client. The user of the client can thus carry out printing via the print portal with the user's own printer without being specifically conscious of the presence of the security system 60. The printing system of the embodiment accordingly enhances the utility of printing via the Internet without lowering the security level.

The above embodiment uses the address information of the client as the specification information, although this is not restrictive at all. Any of diverse information is usable as the specification information, which specifies that the transmitter of the printing requirement sent from the print portal PP to the security system 60 is the client located close to the printer. Typical examples of the available information include the user ID and the password used for printing, the job number included in the printing requirement, the file name and the URL for specifying the content of interest, and the address information of the print portal. In the case where a certain piece of information that is not suitable for detection by the unit of the packet, for example, the user ID, is used as the specification information, the input packet is reconstructed to a file and analyzed by the unit of the file in the security system 60.

D. Second Embodiment

The configuration of the first embodiment modifies the settings in the filtering table and limitedly remits the security level under the condition that the client is located near to the printer. In the configuration of a second embodiment, on the other hand, the security system cooperates with the print portal to limitedly remit the security level.

Figure 10:
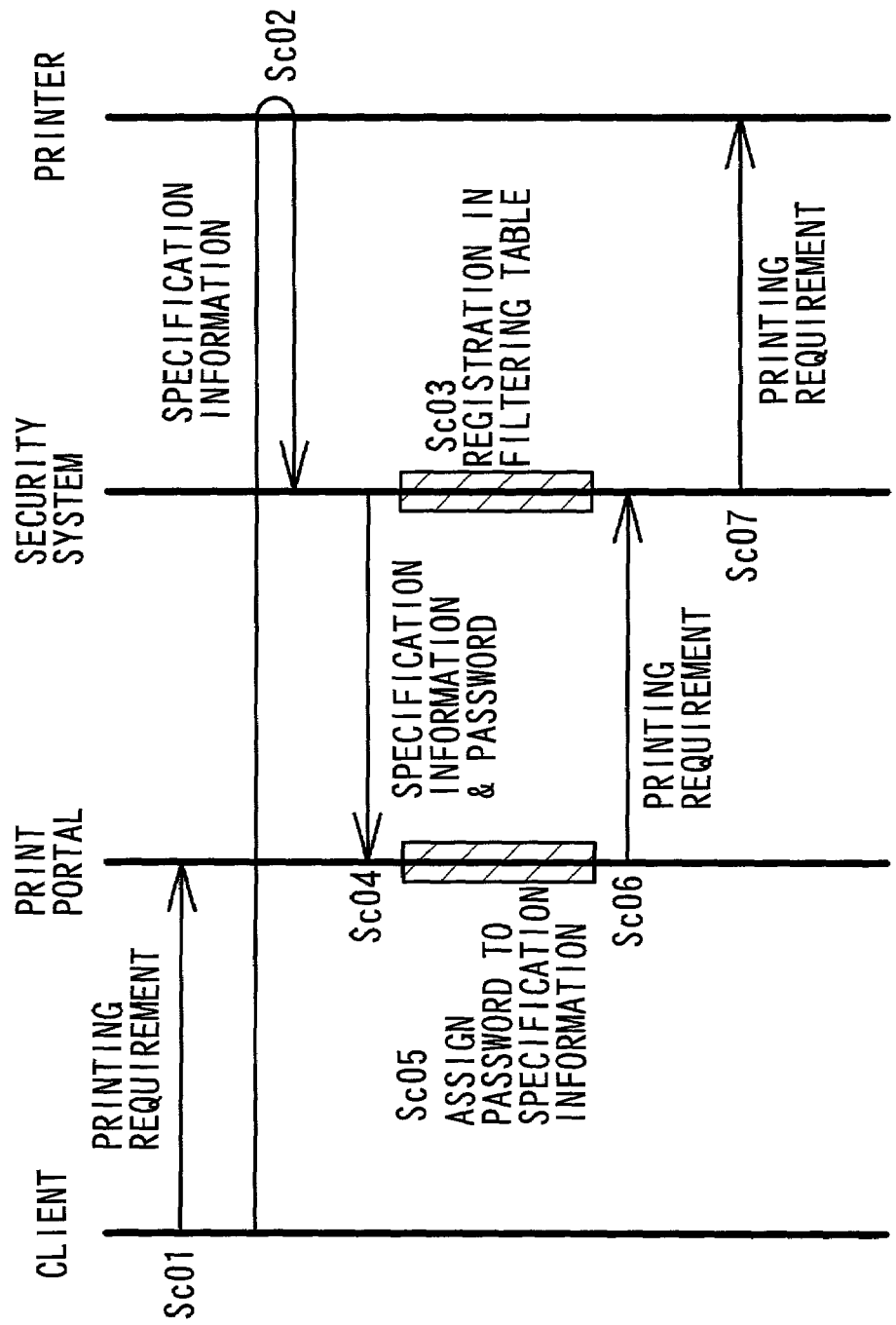
FIG. 10 shows a sequence of printing with the printer in the office in a second embodiment of the present invention.

FIG. 10 shows a sequence of printing with the printer in the office in the second embodiment. The configuration of the security system 60 in the second embodiment is similar to that of the first embodiment (see FIG. 7). Whereas the procedure of the first embodiment determines permission or refusal of transmission by the unit of the packet, the procedure of the second embodiment determines permission or refusal of transmission by the unit of the file. The security system 60 gives permission of transmission to only files having a preset password in their headers. The password is registered in the filtering table 64.

The client MP outputs a printing requirement to the print portal PP (step Sc01). In the case where the client MP is located near to the printer 70, the direct communication C2 is established simultaneously between the printer 70 and the client MP. The printer 70 fetches specification information from the client MP and transmits the fetched specification information to the security system 60 according to the procedure discussed above with reference to FIG. 7 (step Sc02). Any of the diverse information enumerated in the first embodiment is applicable for the specification information. In the following description, for convenience of explanation, it is assumed that the user ID is used as the specification information.

The security system 60 receives the transmitted specification information, maps the condition for allowing transmission, that is, the password, to the specification information, and transmits the mapped condition to the print portal PP (step Sc04). The transmitted password may be a fixed password generally used in the security system 60. In the configuration of the second embodiment, however, a temporarily authorized password is newly set to prevent the security level from being lowered. In parallel with transmission of the password, the security system 60 registers the newly set password in the filtering table 64 (step Sc03). The processing of step Sc03 is omitted in the case of the fixed password.

The print portal PP assigns the received password to the header of the file transmitted as the printing requirement (step Sc05). This sets the printing requirement as the file transmittable through the security system 60. The printing requirement output from the print portal PP to the security system 60 (step Sc06) accordingly passes through the security system 60 and is transmitted to the printer 70 for printing (step Sc07).

In the construction of the second embodiment, the security system 60 carries out the maintenance of the filtering table 64 according to the procedure discussed in the first embodiment. When a client fails in establishing direct communication with the printer, the password assigned to the client is deleted from the filtering table 64.

The arrangement of the second embodiment ensures the sufficient level of security, while enhancing utility of printing via the Internet.

E. Third Embodiment

The first and the second embodiments regard the push-type transmission where a printing requirement is transmitted from the print portal PP to the security system 60. A third embodiment, on the other hand, regards limited remission of the security level in the pull-type transmission where the security system 60 fetches a printing requirement from the print portal PP.

Figure 11:
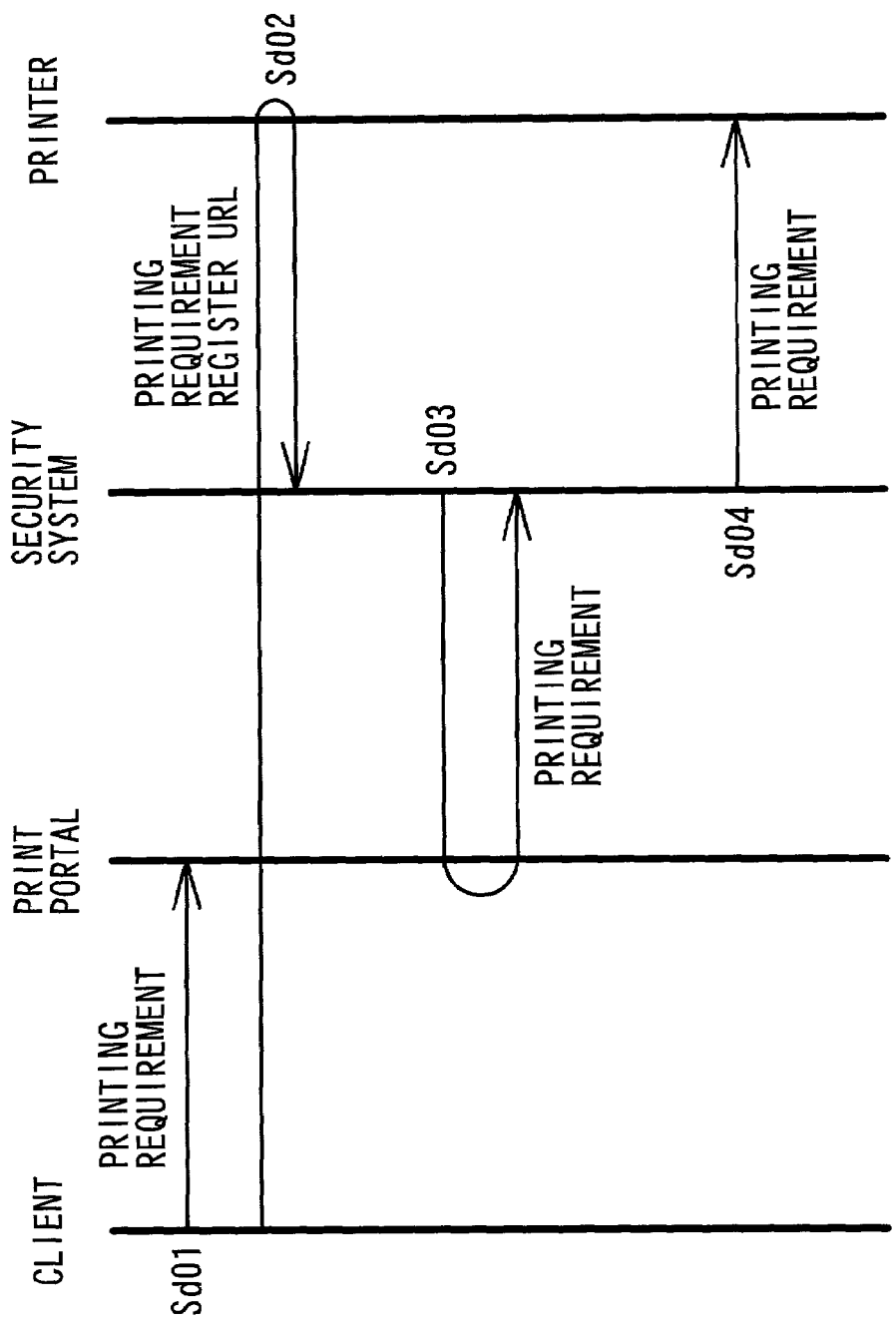
FIG. 11 shows a sequence of printing with the printer in the office in a third embodiment of the present invention.

FIG. 11 shows a sequence of printing with the printer in the office in the third embodiment. The configuration of the security system 60 in the third embodiment is similar to that of the first embodiment (see FIG. 7). In the construction of the third embodiment, the filtering module functions to fetch a printing requirement from a specified server, in addition to filtering of the packet transmitted from outside.

The client MP outputs a printing requirement to the print portal PP (step Sd01). The print portal PP temporarily registers the input printing requirement into its own server. The client MP is notified of the URL of the registration.

In the case where the client MP is located near to the printer 70, the direct communication C2 is established between the client MP and the printer 70. The printer 70 fetches specification information from the client MP and transmits the fetched specification information to the security system 60 according to the procedure discussed above with reference to FIG. 7 (step Sd02). Any of the diverse information enumerated in the first embodiment is applicable for the specification information. In the third embodiment, the URL of the registration of the printing requirement is used as the specification information.

The security system 60 receives the specification information and gains access to the URL specified by the specification information to fetch the printing requirement (step Sd03). In the case where the user ID of the client is used as the specification information, the print portal PP specifies the location of registration of the printing requirement corresponding to the specification information transmitted from the security system 60 and returns the printing requirement to the security system 60. In any case, the security system 60 fetches the printing requirement through the pull-type transmission, so that there is no need of filtering. The security system 60 transfers the fetched printing requirement to the printer 70, which then implements the actual printing operation corresponding to the printing requirement (step Sd04).

In the configuration of the third embodiment, it is preferable that the security system 60 stops fetching the printing requirement when the client fails in establishing direct communication with the printer. The arrangement of the third embodiment ensures the sufficient level of security, while enhancing utility of printing via the Internet.

F. Fourth Embodiment

In the configuration of a fourth embodiment, bypass information for bypassing the security system 60 is sent from the printer 70 to the client MP, so as to attain limited remission of the security level.

Figure 12:
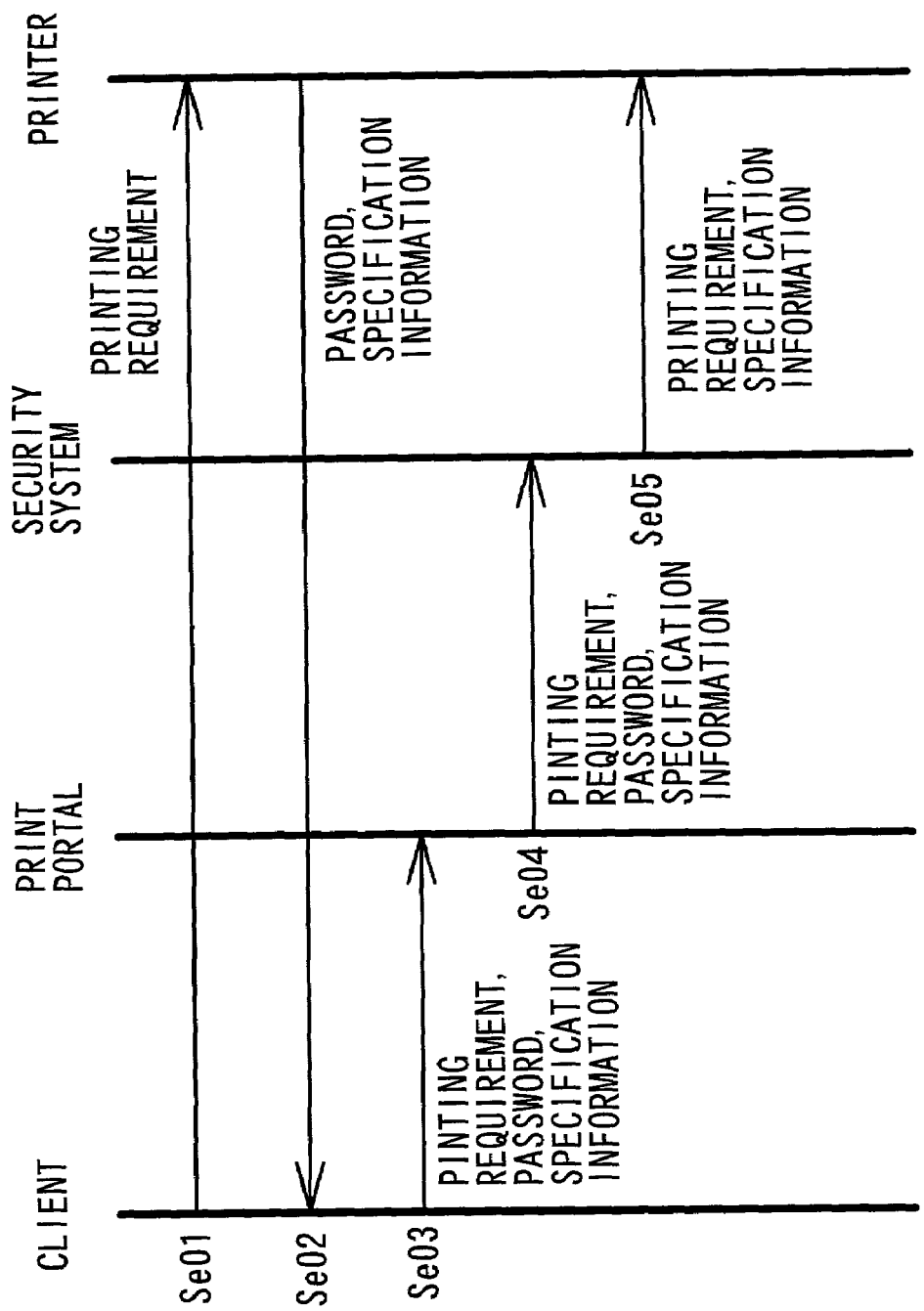
FIG. 12 shows a sequence of printing with the printer in the office in a fourth embodiment of the present invention.

FIG. 12 shows a sequence of printing with the printer in the office in the fourth embodiment. The configuration of the security system 60 in the fourth embodiment is similar to that of the first embodiment (see FIG. 7). In the construction of the fourth embodiment, the filtering module carries out filtering to allow transmission of only packets with a preset password assigned thereto among all the packets transmitted from outside.

The client MP outputs a printing requirement to the printer 70 (step Se01). In response to the transmission of the printing requirement, the printer 70 transmits a password for bypassing the security system 60 and specification information for specifying the printer 70 to the client MP (step Se02). Bluetooth, for example, is applied for the communication between the client MP and the printer 70. The password and the other information are coded prior to transmission to be not visually recognizable by the user of the client MP. The information transmitted from the printer 70 is not displayed on the client MP, but only a prompt is displayed on the client MP to show that the communication is completed to be ready for transmission of the printing requirement to the print portal PP.

The specification information is information intrinsic to the printer, for example, address information for specifying the printer on the network or an ID number used for identification of the printer by the print portal. In the example of FIG. 12, the specification information is transmitted together with the password for bypassing the security system 60. One possible modification may utilize the specification information as the password.

In response to the display of the prompt, the client MP transmits the printing requirement, together with the password and the specification information received from the printer 70, to the print portal PP (step Se03).

The print portal PP then transmits the printing requirement, the password, and the specification information to the security system 60 (step Se04). The security system 60 authenticates the password and allows transmission of the received printing requirement to the specified printer (step Se05). This implements printing that bypasses the security system.

G. Modifications

The above embodiments regard printing via the print portal. The technique of the present invention is, however, not restricted to such a printing system but is also applicable to another printing system where the printing requirement is transmitted directly from the client to the printing apparatus. In the latter printing system, for example, IPP (Internet Printing Protocol), a protocol for printing via a network, is applicable for printing.

In the embodiments discussed above, the security system 60 is constructed inside the printing service provider. The security system 60 may be constructed at any arbitrarily selected location according to the necessary security level.

In the above embodiments, the printing apparatus is adopted as the output device. The technique of the present invention is generally applicable to a diversity of output devices that output images, documents, sound, and other data, for example, image display devices like projectors and displays and audio equipment that output sound.

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. For example, the series of control processes discussed above may be attained by the hardware construction, instead of the software configuration.

The scope and spirit of the present invention are indicated by the appended claims, rather than by the foregoing description.

What is claimed is:

1. A security system that is interposed between an output device and an external network and limits external access to said output device, said security system comprising:
    a filtering module that refuses transmission of data from the external network under a predetermined condition;
    a detection module that detects establishment of direct communication between said output device and a client, which gives an output requirement to said output device; and
    a control module that, when the establishment of direct communication is detected, controls said filtering module to cancel the refusal to the output requirement given by said client.

2. A security system that is interposed between an output device and an external network and limits external access to said output device, said security system comprising:
    a filtering module that refuses transmission of data from the external network under a predetermined condition;
    a specification information fetching module that fetches specification information via said output device, said specification information specifying an output requirement transmitted from the external network to said output device, said specification information being transmitted through direct communication between a client that gives the output requirement and said output device; and
    a control module that controls said filtering module to permit transmission of an output requirement that meets the specification information.

3. A security system in accordance with claim 2, wherein the specification information is identification information assigned to the output requirement.

4. A security system in accordance with claim 2, wherein the specification information is identification information that is used to specify either one of the client and a user of the client as a transmitter of the output requirement.

5. A security system in accordance with claim 2, wherein the external network is further provided with an output mediation server that is interposed between said client and said security system and transmits the output requirement to said output device in response to an instruction given by said client, and
    the specification information is identification information that is used to specify said output mediation server as a transmitter of the output requirement.

6. A security system in accordance with claim 2, wherein said control module carries out the control only while direct communication between said client and said output device is established.

7. A security system that is interposed between an output device and an output mediation server connecting with an external network and limits access from said output mediation server to said output device, said security system comprising:
    a filtering module that rejects transmission of data, which is sent from the external network but does not satisfy a predetermined bypass condition;
    a specification information fetching module that fetches specification information via said output device, said specification information specifying an output requirement transmitted from said output mediation server to said output device, said specification information being transmitted through direct communication between a client that gives the output requirement and said output device; and
    a condition transmission module that, when the specification information is fetched, maps the specification information to the bypass condition and transmits the mapped bypass condition to said output mediation server.

8. A security system in accordance with claim 7, wherein the bypass condition holds only while the direct communication between said client and said output device is established.

9. An output mediation server that is interposed between a client and an output device connecting with a security system in a network and transmits an output requirement given by said client to said output device,
    wherein said security system refuses transmission of data that does not meet a predetermined bypass condition,
    said output mediation server comprising:
    an input module that receives an instruction with regard to the output requirement given by said client;
    a bypass condition input module that receives specification information for specifying the output requirement and the predetermined bypass condition from said security system; and
    an output requirement transmission module that generates an output requirement meeting the predetermined bypass condition and transmits the output requirement to said security system.

10. A security system that is interposed between an external network and an output device and limits access from the external network to said output device, said security system comprising:
    a filtering module that refuses transmission of data from the external network under a predetermined condition;
    a specification information fetching module that fetches specification information via said output device, said specification information specifying a location of an output requirement, which is to be transmitted to said output device, on the external network said specification information being transmitted through direct communication between a client that gives the output requirement and said output device; and
    an output requirement acquisition module that, when the specification information is fetched, acquires the output requirement from the location specified by the specification information in such a manner that bypasses the refusal by said filtering module.

11. A security system in accordance with claim 10, wherein said output requirement acquisition module acquires the output requirement only while the direct communication between said client and said output device is established.

12. An output device that carries out an output operation in response to an output requirement sent from an external network via a security system, which is interposed between said output device and the external network, said output device comprising:
a communication module that establishes direct communication with a client, which gives the output requirement;
a fetching module that activates said communication module to fetch specification information for specifying the output requirement, which is transmitted from the external network to said output device; and
a transmission module that transmits the specification information to said security system.

13. An output device in accordance with claim 12, wherein said communication module has a communicable range that is restricted to be within a predetermined distance from said output device.

14. An output device in accordance with claim 13, wherein said communication module utilizes either one of infrared ray and feeble radio wave for communication.

15. An output device that carries out an output operation in response to an output requirement sent from an external network via a security system, which is interposed between said output device and the external network, said output device comprising:
a communication module that establishes direct communication with a client, which gives the output requirement; and
a bypass information transmission module that activates said communication module to transmit bypass information, which is required for bypassing said security system, to said client.

16. An output device in accordance with claim 15, wherein the bypass information is intrinsic to said output device.

17. A security method that utilizes a security system interposed between an output device and an external network to limit external access to said output device, said security method comprising the steps of:
(a) refusing transmission of data from the external network under a predetermined condition;
(b) detecting establishment of direct communication between said output device and a client, which gives an output requirement to said output device; and
(c) when the establishment of direct communication is detected, bypassing said step (a) with regard to the output requirement given by said client.

18. A security method that utilizes a security system interposed between an output device and an external network to limit external access to said output device, said security method comprising the steps of:
fetching specification information via said output device, said specification information specifying an output requirement transmitted from the external network to said output device, said specification information being transmitted through direct communication between a client that gives the output requirement and said output device; and
refusing transmission of data from the external network under a predetermined condition, while permitting transmission of an output requirement that meets the specification information.

19. A security method that utilizes a security system interposed between an output device and an output mediation server connecting with an external network to limit access from said output mediation server to said output device, said security method comprising the steps of:
fetching specification information via said output device, said specification information specifying an output requirement transmitted from said output mediation server to said output device, said specification information being transmitted through direct communication between a client that gives the output requirement and said output device; and
when the specification information is fetched, mapping the specification information to a predetermined bypass condition, which is set to bypass refusal of data transmission by said security system, and transmitting the mapped bypass condition to said output mediation server.

20. An output mediation method that utilizes an output mediation server interposed between a client and an output device connecting with a security system in a network to transmit an output requirement given by said client to said output device,
wherein said security system refuses transmission of data that does not meet a predetermined bypass condition, said output mediation method comprising the steps of:
receiving an instruction with regard to the output requirement given by said client;
receiving specification information for specifying the output requirement and the predetermined bypass condition from said security system; and
generating an output requirement meeting the predetermined bypass condition and transmitting the output requirement to said security system.

21. A security method that utilizes a security system interposed between an external network and an output device to limit access from the external network to said output device, said security method comprising the steps of:
(a) refusing transmission of data from the external network under a predetermined condition;
(b) fetching specification information via said output device, said specification information specifying a location of an output requirement, which is to be transmitted to said output device, on the external network , said specification information being transmitted through direct communication between a client that gives the output requirement and said output device; and
(c) when the specification information is fetched, acquiring the output requirement from the location specified by the specification information in such a manner that bypasses the refusal in said step (a).

22. A computer readable recording medium in which a computer program is recorded, said computer program causing a computer for security interposed between an output device and an external device to limit external access to said output device, said computer program causing the computer to attain the functions of:
refusing transmission of data from the external network under a predetermined condition;
detecting establishment of direct communication between said output device and a client, which gives an output requirement to said output device; and
when the establishment of direct communication is detected, bypassing the refusal to the output requirement given by said client.

23. A computer readable recording medium in which a computer program is recorded, said computer program causing a computer for security interposed between an output device and an external device to limit external access to said output device, said computer program causing the computer to attain the functions of:

fetching specification information via said output device, said specification information specifying an output requirement transmitted from the external network to said output device, said specification information being transmitted through direct communication between a client that gives the output requirement and said output device; and refusing transmission of data from the external network under a predetermined condition, while permitting transmission of an output requirement that meets the specification information.

24. A computer readable recording medium in which a computer program is recorded, said computer program causing a computer for security interposed between an output device and an output mediation server connecting with an external network to limit access from said output mediation server to said output device, said computer program causing the computer to attain the functions of:

fetching specification information via said output device, said specification information specifying an output requirement transmitted from said output mediation server to said output device, said specification information being transmitted through direct communication between a client that gives the output requirement and said output device; and when the specification information is fetched, mapping the specification information to a predetermined bypass condition, which is set to bypass the limit of access, and transmitting the mapped bypass condition to said output mediation server.

25. A computer readable recording medium in which a computer program is recorded, said computer program utilizing an output mediation server interposed between a client and an output device connecting with a security system in a network to transmit an output requirement given by said client to said output device, said computer program causing said output mediation server to attain the functions of:

receiving an instruction with regard to the output requirement given by said client;

receiving specification information for specifying the output requirement and a predetermined bypass condition, which is set to bypass refusal of data transmission by said security system, from said security system; and generating an output requirement meeting the predetermined bypass condition and transmitting the output requirement to said security system.

26. A computer readable recording medium in which a computer program is recorded, said computer program causing a computer for security interposed between an external network and an output device to limit access from the external network to said output device, said computer program causing the computer to attain the functions of:

refusing transmission of data from the external network under a predetermined condition;

fetching specification information via said output device, said specification information specifying a location of an output requirement, which is to be transmitted to said output device, on the external network, said specification information being transmitted through direct communication between a client that gives the output requirement and said output device; and when the specification information is fetched, acquiring the output requirement from the location specified by the specification information in such a manner that bypasses the refusal.

* * * * *